Feb. 4, 1958  A. J. SARNO  2,821,871
METHOD OF MAKING DIE-CUTTING APPARATUS
Filed Feb. 28, 1955  2 Sheets-Sheet 1
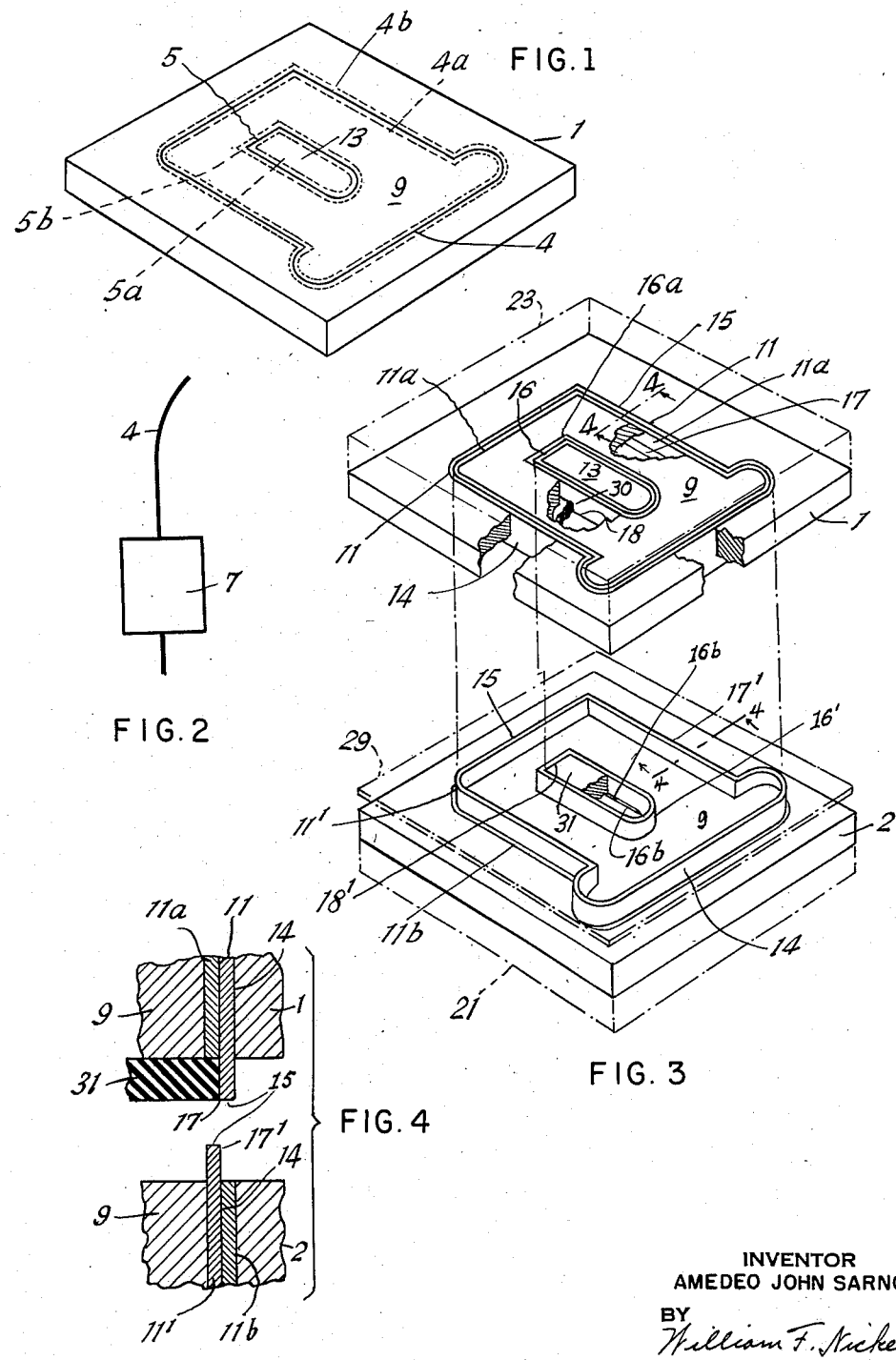
INVENTOR
AMEDEO JOHN SARNO
BY
William F. Nickel
ATTORNEY

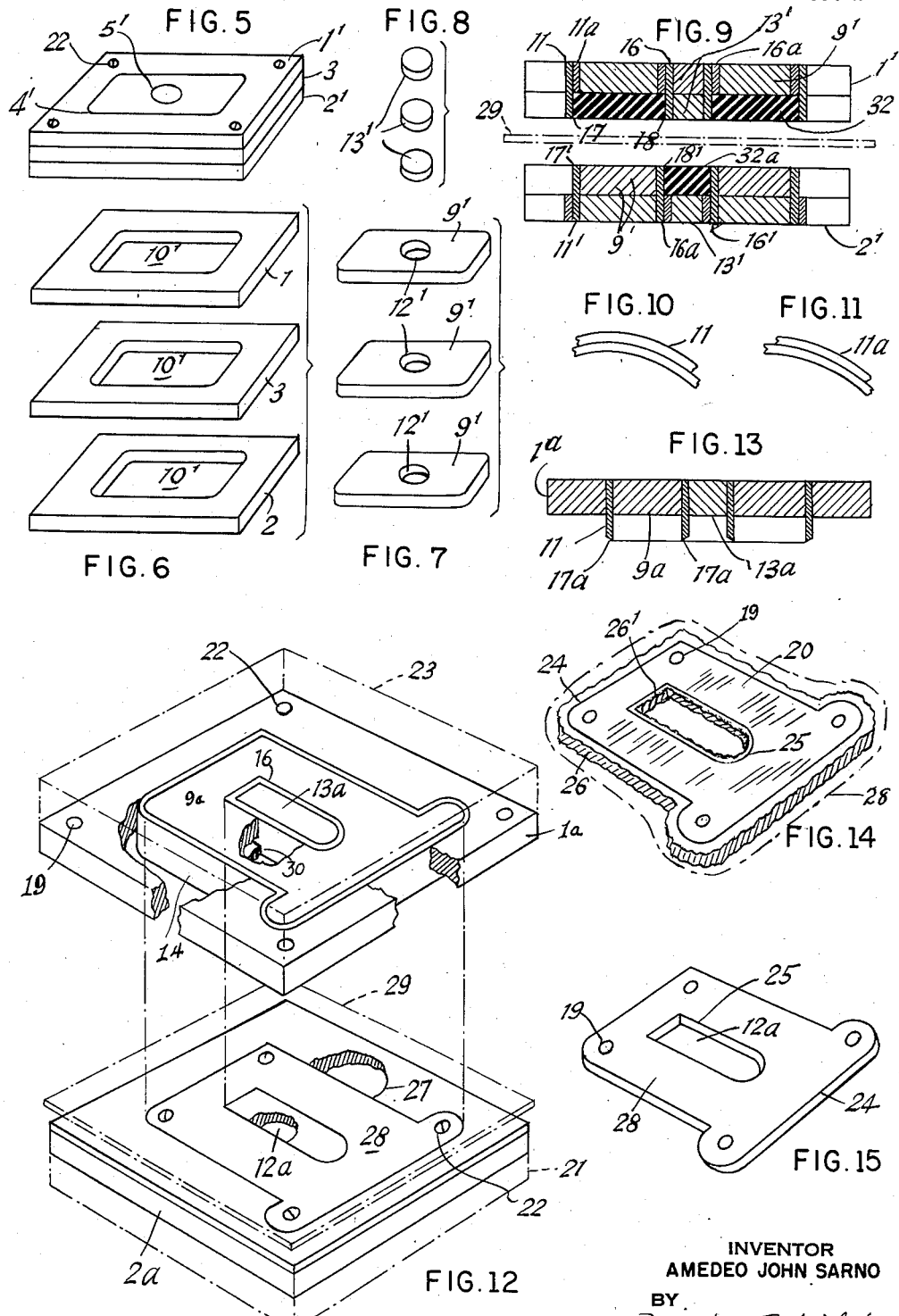

United States Patent Office 2,821,871
Patented Feb. 4, 1958

2,821,871

METHOD OF MAKING DIE-CUTTING APPARATUS

Amedeo John Sarno, Oceanside, N. Y., assignor of one-half to F. Jarvis Page, Garden City, N. Y.

Application February 28, 1955, Serial No. 491,055

4 Claims. (Cl. 76—107)

My invention is an improvement in die-cutting apparatus and methods of producing die members; especially die-cutting apparatus for making flat pieces of metal having any selected outline, by shearing metal stock with blades or strips and other members in combination with blades, all conforming to the shape of the parts required, as set forth in my co-pending applications, Serial Nos. 356,173 and 356,174 filed May 20, 1953 now Letters Patent Nos. 2,703,022 and 2,703,023 respectively.

It is an object of this invention to provide a die of superior construction, and a method of quickly preparing and assembling dies for correct operation.

A further object is to provide die-cutting apparatus which can be easily made ready for use, which will fully prevent impairment of the material and deliver pieces that are quite smooth and finished, without burrs or other rough portions and structurally sound throughout; and to devise a method and means for producing dies that will always turn out pieces of virtually the exact size required in all dimensions, wholly without rough or partly bent edges, and free from minute cracks and fissures over their entire area.

An additional object is to provide die cutting apparatus having parts that can be rapidly and inexpensively shaped, so that a really large number of die members can be completed in a short time.

Another object is to provide die-cutting apparatus having most efficient cutting edges, which will invariably give the best results in practice.

The nature and advantages of the invention are fully described herein, and the novel features are pointed out in the claims. On the drawings the best form of my invention is illustrated, but variations in structural details and in other minor respects may be adopted without material alteration or omission of any of the essential characteristics.

On the drawings:

Figure 1 shows in perspective material used in producing a die member.

Figure 2 shows the first step in the preparation of said die member.

Figure 3 is a perspective view of associated die members in relative positions for operation;

Figure 4 is a diagrammatic view in section on lines 4—4 in Figure 3 showing how all parts of such die members are assembled according to my invention;

Figure 5 is a perspective view of another arrangement of materials used in forming a die member;

Figures 6, 7 and 8 are diagrammatic views of parts obtained by dividing said materials; there being several sets of said parts;

Figure 9 is a cross section of a pair of die members containing said materials;

Figures 10 and 11 show how the cutting blades for the die members are bent to enclose the required kind of outline in conjunction with said materials;

Figure 12 is a perspective view of another pair of completed die members in readiness for the practical work which they are adapted to perform in regular use;

Figure 13 is a cross section of the upper die member appearing on Figure 12; and Figures 14 and 15 are perspective views showing how the lower die member in Figure 12 is obtained.

I shall first describe the die members shown in Figures 1, 2, 3 and 4.

First, an outline enclosing an area of the same form and extent as a piece or pattern to be die-cut, said piece having the shape required, is drawn upon a base member such as a block 1 of plastic or wood; for example, maple plywood. The periphery of the piece may be smooth along the outer edges or have sharply defined projections or recesses, or both, and its surface may be continuous or present one or more openings. The form of the pattern is indicated by the line 4 in Figure 1. The pattern may be laid on the block or plate 1, and the peripheral outline 4, which must be clear, fine and sharp, is traced on the block 1 closely around the edges of the pattern by a pointed implement, not shown. The enclosed area must always be of exactly the same size and contour as the piece to be die-cut, and a portion of the block 1 enclosed within the outline 4 is then cut free and removed. The thickness of the steel blades or cutting strips, such as appear at 11 in Figure 4, to be used, must be taken into account. Suppose, for example, the blades are .032 inch thick. The block or member 1 is now cut by a jig saw of double this width (.064 inch) moving along the line 4, with said line 4 always in the middle of said saw. This method permits the blocks to be worked in the same way for both male and female die members, as set forth below.

The operation is indicated diagrammatically on an exaggerated scale in Figure 1. Here the space between the lines 4a and 4b represents the cut made by the saw 7, this cut having a width equal to the thickness of the jig saw blade indicated at 7 which makes its incision in the block 1 with one face always flush with the line 4a, and the other flush with the line 4b. The lines 4a and 4b need not be actually inscribed on the block 1; they merely indicate the positions of the opposite faces of the saw 7 as it advances along the visible line 4. The saw 7 has double the thickness of the blades for the die (.064 inch in the example given) as above stated, and does its cutting always with the line 4 midway between its opposite faces; and half the space between the two lines 4a and 4b represents the allowance for the thickness of the die-cutting elements or blades to be set into the block 1. See Figure 2.

The cut-out section 9 (Figure 1) is now removed, and the aperture left in the block 1 now has the same shape as the piece to be blanked, but is somewhat larger. The next step is to line the opening closely with steel strips or blades 11 in one piece, or in separate lengths or sections, to serve as the shearing elements of the die. These blades are bent to conform fully to the outline of the aperture made by extracting the portion 9 and when all are in position, the section 9 is replaced. For a larger or female die the blades are placed against the outer sides of the space between the block 1 and the portion 9; and the remainder of this space, which is within the compass of the blades 11, is filled with metal lining and retaining strips 11a of the same thickness as the blades 11. See the upper part of Figure 3. As the section 9 has the same periphery around it at all points as the piece to be produced, the cut-out section and the lining members 11a fit within the blades 11 tightly and bind all the members 11 between the cut-out portion 9 and the remainder of the plywood 1. See also the upper part of Figure 4.

For a male die member, the blades 11′ are disposed against the section 9, and the space between the blades and the edge of the opening in the block marked by the line 4b, is filled with metal lining strips 11b and the blades and portion 9 as before are held tightly in place. See the lower portion of Figure 4.

A male die member of such design is indicated at the lower part of Figure 3, with a matching female die member above it, and the two members are mounted so that the upper blades 11 can envelop the lower blades 11' at all points when the die members are operated to cut out a piece having the outline defined by these dies. All the blades and all the lining strips should preferably have the same thickness.

In case the piece has an opening of any shape, it will be worked to present a corresponding opening or aperture in the section 9. To this end the block or member 1 is marked with a line 5 defining the opening in said piece, and of exactly the same size, and imaginary inside and outside lines 5a and 5b, which are not inscribed on the portion 9, are parallel to line 5, and each is separated from it by a space equal to the thickness of the blades to be used. The block 1 is cut by a jig saw centered on the line 5 as on the line 4, and moving with its sides on the parallel lines 5a and 5b to sever a part 13. The cut-out part 13 is smaller all around than the opening in the section by an amount equal to the half of the thickness of the saw, and the saw employed for this step again will have double the thickness of the blade 7 (Figure 2) which are to be used to line the opening in the block 1 left by the part 13, in the manner described above with reference to the aperture filled by section 9. The cut-out part 13 is of course replaced in the portion 9 when the blades 16 are in position; and said blades in combination with lining members 16a hold the blades securely in the block 1. The space enclosed by the blades 16 around the block 13 will be smaller than the outline 5 while the lining members 16a are on the outer faces of the blades, and surround the blades, as in the upper part of Figure 3, said blades being shown as projecting from the upper block towards the lower block 2, to make a male die member; and said space is equal to the outline 5 when the lining members 16b are on the opposite or inner faces of the blades; as in the lower block 2; but the part 13 plus the thickness of the blades and lining members will cover an area exactly the same as the outline 5, plus half the thickness of the cut made by the saw 7. See the upper part of Figure 3.

A complete die cutting apparatus comprising matched female and male die members is fully illustrated on Figure 3; the lower die member being adapted to register with the upper and fit nicely at all points when the two members are moved accordingly. The portions 9 and 13 are of the same size in each member, but in the upper or female die the lining members 11a are enveloped by the blades 11; while in the lower or male die the lining members 11b envelop the blades 11'; also in the upper die member the blades 16 within the blades 11 are encircled by the lining members 16a; while in the lower die member the blades 16' within the blades 11' encircle the lining members 16b. Thus while the blades 11 in the upper member will envelop the blades 11' of the lower in operation, the blades 16 in the upper member will fit within the blades 16' of the lower. The upper die member has its face with blades projecting presented downward, while the other has its face with blades projecting presented towards the blades of the upper die member. The lining strips do not project from either face of the blocks 1 and 2.

All of the blades are flush along one edge with the one face of the block carrying them, but wide or high enough to project out about a quarter inch from the other face of the block, and their projecting edges are of course all flush with one another. The opposite edges are of course also flush with one another as well as with the adjacent surfaces or backs of the blocks. The blades or shearing elements 11, 11', 16 and 16' have smooth side faces 14, but their outer projecting edges are really narrow surfaces 15 that make angles of 90 degrees to the surface 14; see Figure 4. The shearing is done along the inner corner 17 of the blades surrounding the section 9 in the upper block and along the outer corners 18 of the blades 16 around the part 13 in the block 1, and along the adjacent outer corners 17' of blades 11' and inner corners 18' of the blades 16' in the block 2. The blades are therefore rugged and durable and will serve without deformation over long runs in real work. If necessary they can be specially hardened or resharpened. The blades protrude from both blocks as far as required.

The two die members comprising the blocks 1 and 2 with blades and strips are now engaged with each other by inserting the blades 11' and 16 into the loops defined by the blades 11 and 16' respectively, and the two blocks are now mounted in a die press. The member having blades 11 and 16 and block 1 is then affixed inverted to the head shown diagrammatically at 23 of the press and the head is operated so as to bring it close to the press bed plate indicated at 21. The correct position of the block 2 having the blades 11' and 16' on the bed plate 21 is thus ascertained and the block 2 can then be affixed to the bed plate 21 so that the edges (Figures 3 and 4) at the outer corners 17' along the blades 11' and at the inner corners 17 along the blades 11 will cooperate in shearing the metal stock to reproduce the peripheral outline of the piece 1. This is indicated by the vertical dot-and-dash lines on Figure 3. Likewise the inner corners 18' of the blades 16' cooperate with the outer corners 18 of blades 16. Rubber 30 or other cushioning material is laid on the block 1 within the blades 11. Also rubber 31 may be laid within the blades 16' on the block 2. With the blades 16' enveloping the blades 16, rubber should be on the block 2 surrounded by the blades 16', to make sure the die cut pieces or scrap can be easily separated from the parts trimmed off by the die members. Rubber or the like may also be laid on the portion 13 in the block 1, the portion 9 in the block 2, and around the blades 11 and 11' on both blocks. The metal stock between the cutting die members is indicated at 29.

With die members thus prepared by cutting a block as above described with a saw of twice the thickness of the blades, or thick enough to permit lining members to be utilized, both blocks can be cut with a single operation in exactly the same manner, instead of marking a block with a line within the outline 4 or 5, and another block with a line surrounding the outlines 4 and 5. For this purpose both blocks can be secured together while being cut, as more fully described below. Thus time and labor and expense are saved and the risk of mistakes in cutting is eliminated.

The blades and lining strips can be bent and inserted in sections, meeting at the corners and other points.

Figure 4 is an enlarged sectional view on upper and lower lines 4—4 in Figure 2, to show clearly the positions of the blades 11 and 11' and the lining strips 11a and 11b.

Figures 5 to 12 inclusive show further how the materials for the die members can be expeditiously formed and assembled. Three blocks 1', 2' and a block 3 between them, preferably all of the same thickness, are secured by screws 22 or other fasteners, and on the upper block a thin closed line 4' is traced according to the shape of the piece to be stamped out. Another loop 5' of the required outline is traced within the area bounded by the line 4', if the piece to be cut is to have an aperture in it. The three blocks are now cut simultaneously by a saw with its center line on the lines 4' and 5' as before, and the saw will have a thickness equal to the combined thickness of the cutting blades and lining strips. Each block then has an opening 10' of the same size and shape therein as shown in Figure 6. The larger portions thus severed from each block are indicated at 9' in Figure 7; and the smaller portions at 13' in Figure 8; the remainder of the blocks 1', 2' and 3 being shown in Figure 6. The blocks are then taken apart.

In locating and mounting the blades, the separate blocks 1' and 2' are taken and blades and lining strips are fixed in place. At first the blades and lining strips are superposed and curved or bent in unison with the blades on the convex or the concave sides of the strip, as shown in Figures 10 and 11, so as to conform perfectly. In the hole 10' of the block 2', blades 11' are inserted, with lining strips 11a between the blades and the edges of that opening; the strips 11a having a width equal to the thickness of the block, and being flush with the faces thereof, but the blades are twice as wide and project from the upper face of the block 2'. The portion 9' severed from the block 2' is now inserted into the space encircled by the blades 11' and laid flush with the upper and lower faces of said block and the opposite edges of the strips 11a. The portion 9' taken from the third block 3 is also inserted within the blades 11' on top of the first portion 9', and is flush with the projecting edges of said blades and the opposite face of the block 2'.

The hole 10' in the block 1' now receives blades 11 and lining strips 11a along the inner faces of the blades 11. The blades and strips are of the same width respectively as before, with the strips flush along both edges with the opposite faces of the block 1 and the blades projecting from the lower face. The portion 9' taken from the block 1' is inserted and its fits tightly within the lining strips 11a and is flush with said strips. When the blocks 1' and 2' are mounted in a press as illustrated in Figure 3, the operation is the same. The inner corners 17 of the blades 11 and the outer corners 17' of the blades 11' are in virtual alinement and will shear through a piece of flat stock 29 to cut out a piece therefrom having the outline 4'.

If the piece to be cut out by the dies has no aperture such as shown at 12', the die members will contain only the blades 11 and 11' in the blocks 1' and 2'. If an opening such as is shown at 12' is to be included, the central part of the lower die member in Figure 9 will be the female die, and the upper die member will be the male die. The opening 12' in the plate 2' receives blade 16' along the edges and within these blades are the lining strips 16a flush along their edges with the block 2' while the blades 16' project from the upper surface of the plate 2'. The smaller portion 13' taken from the plate 2' fits tightly in the plate 2' and is encircled by the lining strips 16 and in direct contact therewith. In the upper plate the strips 16a line the opening 12' in direct contact with the block 1', and are flush along both edges with the two surfaces of the block 1'. The strips 16a surround the blades 16 and, fitting tightly within the compass of the blades 16, are two of the superposed smaller portions 13', one taken from the block 1' and the other from the block 3. The exposed faces of these two portions are flush with the upper face or back of the block 1' and with the projecting edges of the blades 16. The outer corners 18 of the blades 16 are in line with the inner corners 18' of the blades 16'. Surrounded by the blades 11 is a layer of rubber 32 on the lower face of the block 1' and a smaller layer of rubber 32a is on the upper face of the block 2' surrounded by the blades 16'. The remainder of the areas of the two opposing faces of the blocks 1' and 2' between the blades 11 and 11' and the edges of the blocks may also be covered with rubber cushions or other suitable material, and all such material will of course be flush with the projecting edges of the cutting blades in these blocks. Obviously when a piece of flat metal stock 29 is between the plates 1' and 2' and the plates are forced together as on Figure 3, a piece of metal will be cut with the exact configuration of the lines 4' and 5' and of the same size as the areas enclosed by said lines.

The blades 11 and strips 11a can of course (Figs. 10-11) be bent together for the blocks 1 and 2 in Figure 3, and the blocks 1 and 2 of the members in Figure 3 can also be superposed and affixed to each other and cut together by the saw 7, having the thickness aforesaid.

Another way of forming a matching die is illustrated in Figures 12, 13 and 14.

The upper die member in Figure 3 may be utilized or another die member as shown in Figure 13 may be employed. In the latter case an accurate drawing or tracing is again made on a block 1a of the pattern to produce the same outline 4, of the required shape, size and area as before, but the imaginary line 4b shown in Figure 1 lies outside the line 4 and is separated therefrom the same constant distance as before equal to the thickness of a cutting blade; and the cutting is done with a saw half as thick as the saw 7, or only as thick as the cutting blades, along the outside of the outline 4, taking away as much of the line 4 as possible, but not going inside this line. The broken line 4b in Figure 1 outside the line 4 marks the width of the cut by thinner saw. This operation results in making the section 9a equal to the area enclosed by the loop 4. The section 9a is then removed, the blades 11 are put in, and the portion, fitting tightly, is replaced. The part 13a will be cut out with the thinner saw moving along the inside of the line 5 in Figure 1 and in contact therewith. The opening will thus be large enough. The blades 16 are secured in the block around the part 13a and of course all will be of the same thickness. Such a die member is mounted in the press with all the blades projecting downward, as will be understood.

Further the blades 11 and 16 all have their projecting ends bevelled as illustrated in Figure 13. The angle of bevel is 20° to 25°. The sharper edges 17a are along the inside faces of the blades 11, and outside faces of the other blades 16. Hence the areas enclosed by the sharper edges of the blades 11 and 16 is exactly equal to the area of the portion 9a and larger than 13a respectively.

To make a cooperating die member, a plate of flat metal 28a is given a coating of a substance such as "layout blue," indicated at 20. This piece is secured to the lower or bed plate 21 of a die press, with screws 22 entering holes 19 in the piece 28a and in said bed plate to indicate and fix the right position of said piece 28a; and the block 1a with the blades 11 and 16 is secured to the lower face of the upper head 23 in the die press, also by screws engaging similar holes for example, in the block 1a and in the head. The head is now depressed and sharp corner edges 17a of the blades 11 and 16 mark outlines 24 and 25 respectively on the coating 20. The plate 28a is now removed and trimmed closely around the outlines 24 and 25 made by the edges 17a of the blades, but the trimming is done only up to the outlines 24 and 25 but not touching them, as shown in Figure 14. The trimmed piece 28a is then put back on the bed 21, in the same position as before by means of the screws 22; the holes being so located as to be within the larger outline 24. The small strips 26 and 26' along the edges of the outlines 24 and 25 are now cut away by the blades 11 and 16 when the head 23 is again depressed, and the sharp and clean outline 28 of the piece 28a makes the male die member 28 matching the other die member perfectly. In this and all subsequent steps the die member comprising the plate 1a is inverted and affixed to the head 23 with the blades 11 and 16 projecting downward as shown in Figure 13.

The member 28 is mounted on the bed plate 21 and the screws 22 are replaced in the same holes to secure it in exact working position. The working face of the block 1a, between the blades 11 and 16 is covered with a flat sheet of rubber 32 or cork or suitable ejection device, or pieces of rubber engaging the opposing faces of these blades at various separated points, and the said piece forming the male die 28 is surrounded by a flat sheet of rubber 27 or pieces thereof. See Figure 12. All the rubber has the outer face thereof flush with the outer or projecting edges of the blades 11 and 16, and with the upper face of the member 28. The opening 12a, in the member 28 which has the same size as the desired opening in the pattern is also filled with sheet rubber flush with the surface of the member 28. A piece of stock 29 is then laid on the die 28 and when the head 23 is lowered a cleanly cut piece of the exact size and form as the pattern 1 results. Its surfaces on both sides are perfectly flat, not bent over, rough or uneven along the inner or outer edges, and with no small invisible cracks or fissures at any point whatever. When the head is raised the expansion of the compressed rubber 27 around and in the male die 28 and the other die frees the piece cut from the stock 29 so that it can easily be removed.

The vertical dot-and-dash lines in Figure 12 indicate how the blades 11 envelope the outer member 28 around its outer edges and how the blades 16 fit within the opening 12a.

Having described my invention, what I believe to be new is:

1. The method of producing die members comprising shear blades and retaining means, which consists in making a cut along the full outline of a closed figure in a base member, of a width equal to the combined thickness of said blades and retaining means to define a section within said outline of the same shape, mounting shear blades in said cut, spaced from the section and projecting along one edge from said member, disposing retaining means between said blades and said section to secure said blades in place, making a similar cut along a matching outline in another base member, to define a similar section in said other base member, mounting other shear blades in said other base member projecting along one edge therefrom, and in contact with said similar section, disposing other retaining means between said other blades and the edges of said similar cut, in such position so that the first named blades may closely envelope the second named blades when the blades of said members are in engagement with each other.

2. The method of producing die members comprising shear blades and retaining members of equal thickness, which consists in making a cut along the full outline of a closed figure in a base member, of a width equal to the combined thickness of said blades and retaining strips, to define a section within it of the same shape, mounting shear blades in said cut spaced from the section and projecting along one edge from said member, disposing retaining strips between said blades and said section, to secure said blades in place, making a cut along a matching outline in another base member, to define a simliar section in said other base member, mounting other shear blades in said other base member and projecting along one edge therefrom, and in contact with said similar section, disposing other retaining strips between said other blades and the edges of said similar cut in such position so that the first named blades will closely envelope the second named blades when the blades of said members are in engagement with each other.

3. The method of preparing die members which consists in superposing three blocks and securing them together, marking an outline on the outer surface of one of said blocks, cutting through all of said blocks simultaneously along both sides of said outline, removing the severed portions of all said blocks, inserting lining strips and cutting blades into the spaces vacated by said portions in two of said blocks, and arranging said strips in contact with one face of said blades in one of said two blocks and in contact with the opposite faces of said blades in the other of said two blocks, replacing one of the severed portions into each of said two blocks so as to be encompassed by said strips and blades, and superposing the portion severed from the third block upon the portion in one of said two blocks.

4. The method of producing a cutting die which consists in tracing a line on a base member to enclose an area having the size, shape and outline of a pattern, making an incision along said line throughout its length of a width equal to the thickness of a die blade, inserting one or more die blades in said incision and making said blades fast to said member, covering a piece of material with a soft coating, securing said piece to a stationary plate in a press, attaching said member bearing said blades enclosing said outline to a movable head to said press opposite said piece, moving said member into position to imprint said outline on said piece, trimming said piece around said outline on said piece to leave excess material thereabout, and trimming said excess material from said piece about said outline by said blades to cut stock placed between them.

References Cited in the file of this patent

UNITED STATES PATENTS

| | | |
|---|---|---|
| 163,674 | McKenzie | May 25, 1875 |
| 1,701,545 | Shaw | Feb. 12, 1929 |
| 1,701,546 | Shaw | Feb. 12, 1929 |
| 1,701,547 | Shaw | Feb. 12, 1929 |
| 2,495,221 | Berlin | Jan. 24, 1950 |
| 2,619,853 | Lange | Dec. 2, 1952 |
| 2,703,022 | Sarno | Mar. 1, 1955 |
| 2,703,023 | Sarno | Mar. 1, 1955 |